US012665476B2

(12) United States Patent
Braunbeck et al.

(10) Patent No.: US 12,665,476 B2
(45) Date of Patent: Jun. 23, 2026

(54) METHOD FOR MANUFACTURING A ROTOR OF AN ELECTRIC MOTOR USING A TOOL

(71) Applicant: Dr. Ing. h.c. F. Porsche Aktiengesellschaft, Stuttgart (DE)

(72) Inventors: Florian Braunbeck, Stuttgart (DE); Patrick Knecht, Stuttgart (DE); Peter Wurster, Wiggensbach (DE); Tobias Engelhardt, Stuttgart (DE); Johannes Lange, Dettenheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 645 days.

(21) Appl. No.: 18/115,179

(22) Filed: Feb. 28, 2023

(65) Prior Publication Data

US 2023/0344324 A1     Oct. 26, 2023

(30) Foreign Application Priority Data

Apr. 26, 2022     (DE) ..................... 10 2022 110 023.5

(51) Int. Cl.
H02K 15/03 (2025.01)
H02K 1/28 (2006.01)
H02K 15/12 (2025.01)

(52) U.S. Cl.
CPC ............... H02K 15/03 (2013.01); H02K 1/28 (2013.01); H02K 15/12 (2013.01)

(58) Field of Classification Search
CPC ........ H02K 1/2766; H02K 1/28; H02K 15/03; H02K 15/12
USPC .................................................. 29/596, 732
See application file for complete search history.

(56) References Cited

U.S. PATENT DOCUMENTS 11,813,782 B2     11/2023   Schmid
2020/0164556 A1*   5/2020   Kirsch ................ B29C 45/0441
2023/0344324 A1*  10/2023   Braunbeck ........... H02K 1/2766

FOREIGN PATENT DOCUMENTS

CN        204089522 U     1/2015
DE      102016221291 A1    5/2018
DE      102019212205 A1    2/2021
DE      10-2019 127 583     4/2021

(Continued)

OTHER PUBLICATIONS

Spritzgiesswerkzeuge fuer Einsteiger, by Rainer Dangel, Oct. 10, 2016.

*Primary Examiner* — Minh N Trinh
(74) *Attorney, Agent, or Firm* — Buchanan Ingersoll & Rooney PC

(57)     ABSTRACT

A method is provided for manufacturing a rotor (1) of an electric motor. The rotor (1) has a rotor shaft (2), inner sheet metal packets (4), outer sheet metal packets (4), buried magnets (5) arranged in the assembled state between the inner sheet metal packets (3) and the outer sheet metal packets (4), and surface magnets (6) arranged in the assembled state on the outer sheet metal packets (4). The method includes pushing the inner sheet metal packets (3) onto the rotor shaft (2) to achieve alignment rectangularly and coaxially. The rotor (1) is constructed by placing the buried magnets (5) and the outer sheet metal packets (4) on the inner sheet metal packets (3) and the surface magnets (6) on the outer sheet metal packets (4). A total run-out of the rotor (1) thus is set to a predetermined acceptable amount.

4 Claims, 8 Drawing Sheets

(56) References Cited

FOREIGN PATENT DOCUMENTS

| JP | 5720884 | 12/1982 |
| JP | 63161848 | 7/1988 |
| JP | 2006081360 A | 3/2006 |
| JP | 2006180679 A | 7/2006 |

* cited by examiner

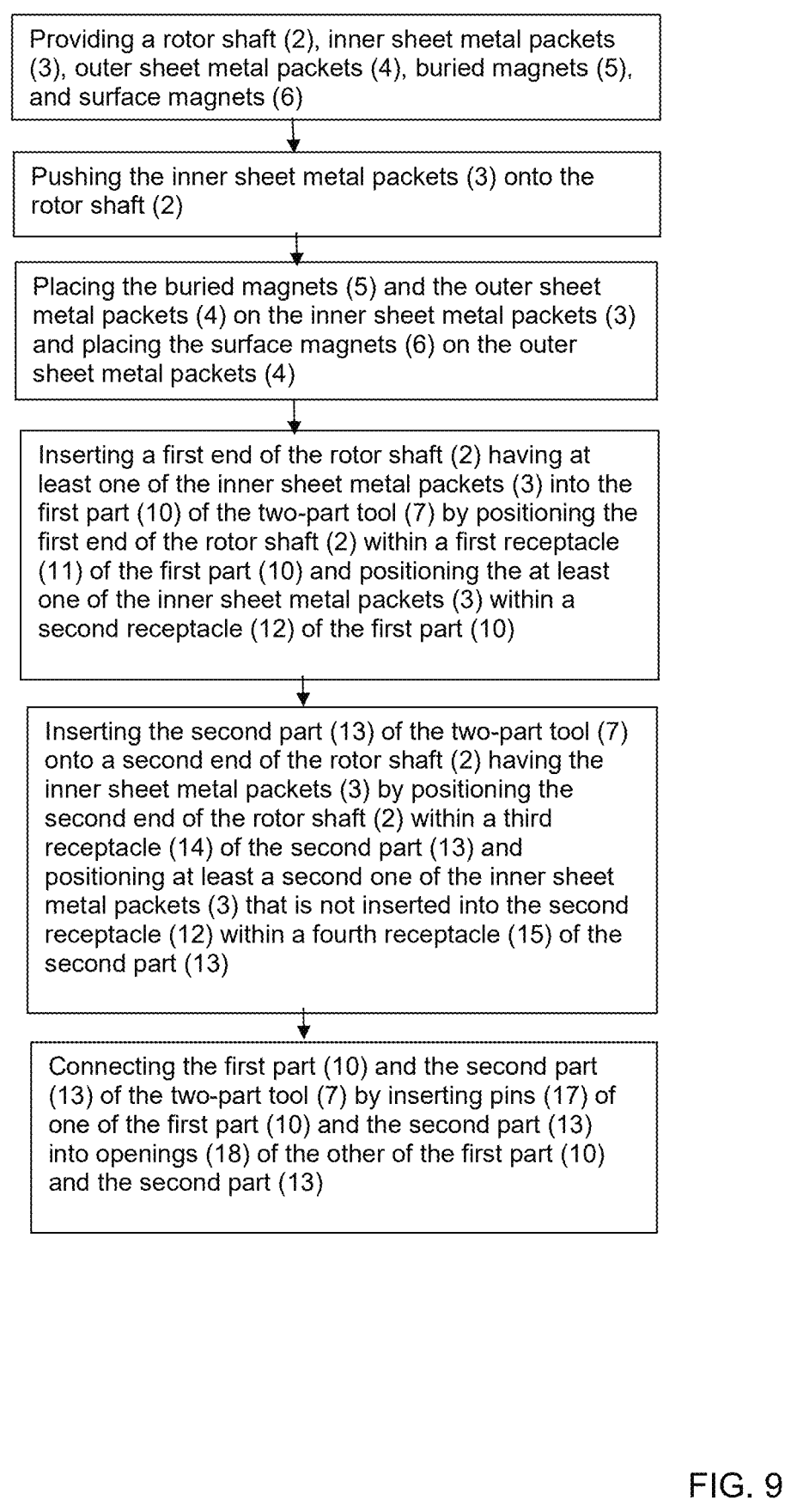

Providing a rotor shaft (2), inner sheet metal packets (3), outer sheet metal packets (4), buried magnets (5), and surface magnets (6)

↓

Pushing the inner sheet metal packets (3) onto the rotor shaft (2)

↓

Placing the buried magnets (5) and the outer sheet metal packets (4) on the inner sheet metal packets (3) and placing the surface magnets (6) on the outer sheet metal packets (4)

↓

Inserting a first end of the rotor shaft (2) having at least one of the inner sheet metal packets (3) into the first part (10) of the two-part tool (7) by positioning the first end of the rotor shaft (2) within a first receptacle (11) of the first part (10) and positioning the at least one of the inner sheet metal packets (3) within a second receptacle (12) of the first part (10)

↓

Inserting the second part (13) of the two-part tool (7) onto a second end of the rotor shaft (2) having the inner sheet metal packets (3) by positioning the second end of the rotor shaft (2) within a third receptacle (14) of the second part (13) and positioning at least a second one of the inner sheet metal packets (3) that is not inserted into the second receptacle (12) within a fourth receptacle (15) of the second part (13)

↓

Connecting the first part (10) and the second part (13) of the two-part tool (7) by inserting pins (17) of one of the first part (10) and the second part (13) into openings (18) of the other of the first part (10) and the second part (13)

FIG. 9

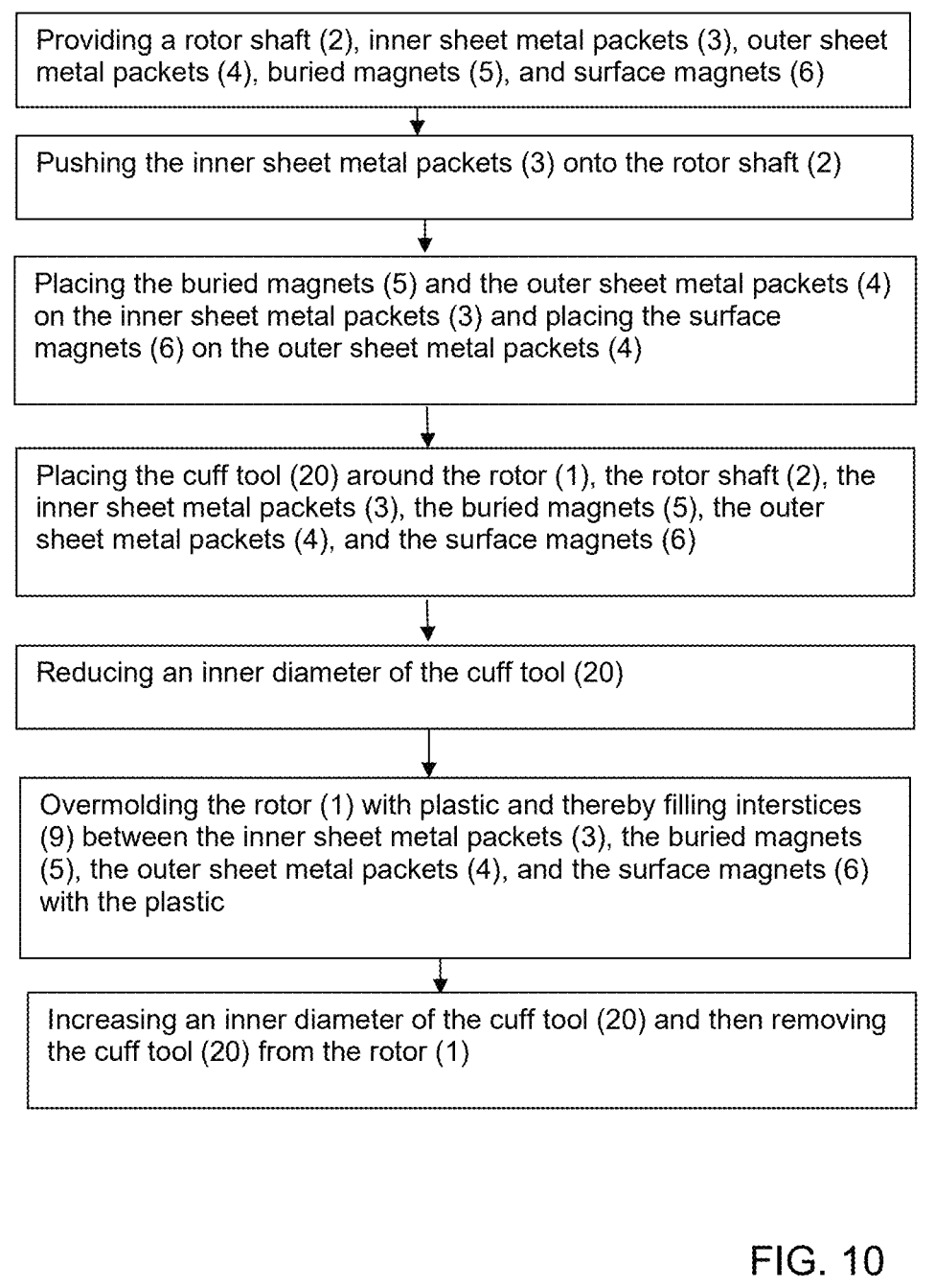

Providing a rotor shaft (2), inner sheet metal packets (3), outer sheet metal packets (4), buried magnets (5), and surface magnets (6)

↓

Pushing the inner sheet metal packets (3) onto the rotor shaft (2)

↓

Placing the buried magnets (5) and the outer sheet metal packets (4) on the inner sheet metal packets (3) and placing the surface magnets (6) on the outer sheet metal packets (4)

↓

Placing the cuff tool (20) around the rotor (1), the rotor shaft (2), the inner sheet metal packets (3), the buried magnets (5), the outer sheet metal packets (4), and the surface magnets (6)

↓

Reducing an inner diameter of the cuff tool (20)

↓

Overmolding the rotor (1) with plastic and thereby filling interstices (9) between the inner sheet metal packets (3), the buried magnets (5), the outer sheet metal packets (4), and the surface magnets (6) with the plastic

↓

Increasing an inner diameter of the cuff tool (20) and then removing the cuff tool (20) from the rotor (1)

FIG. 10

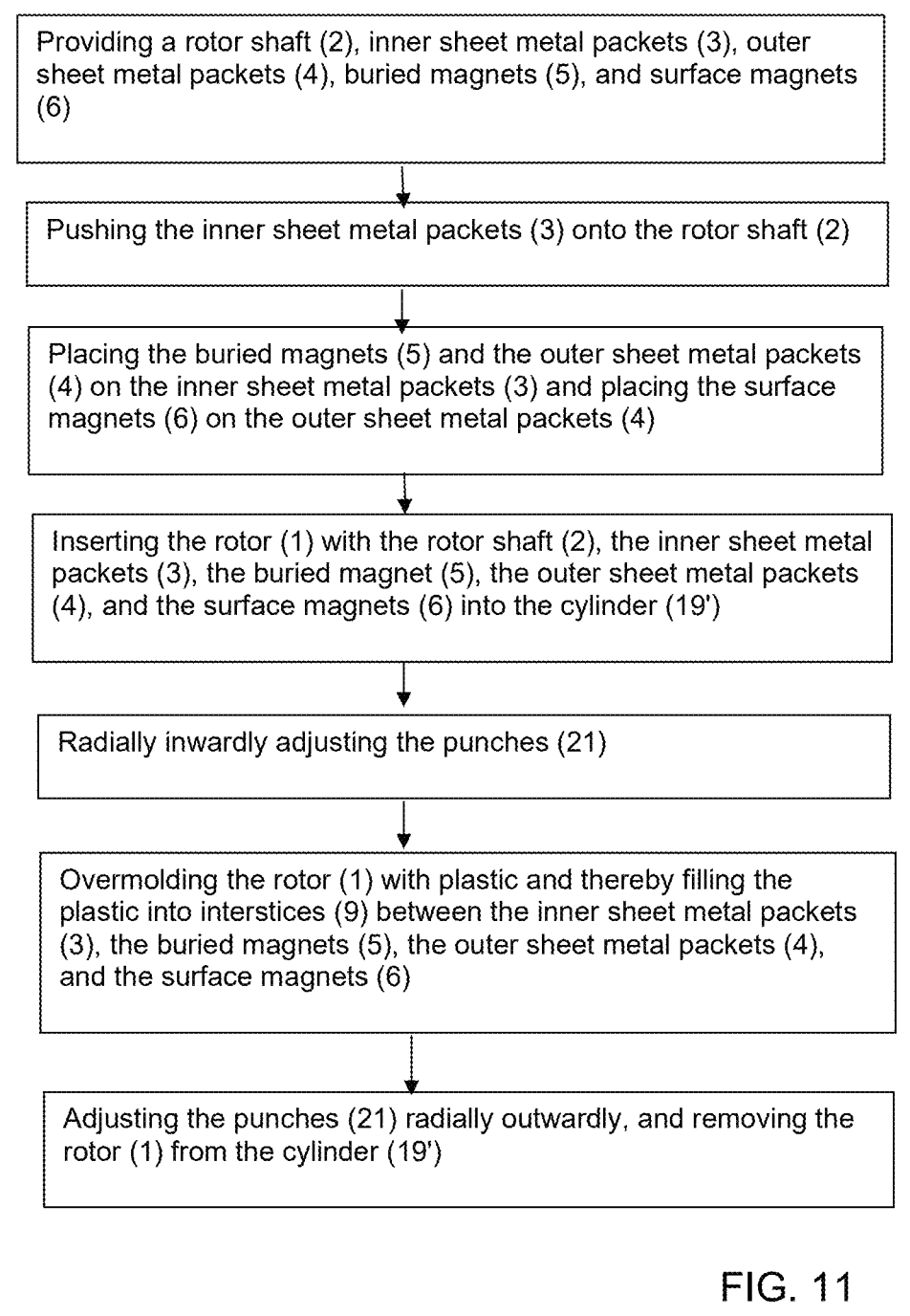

Providing a rotor shaft (2), inner sheet metal packets (3), outer sheet metal packets (4), buried magnets (5), and surface magnets (6)

Pushing the inner sheet metal packets (3) onto the rotor shaft (2)

Placing the buried magnets (5) and the outer sheet metal packets (4) on the inner sheet metal packets (3) and placing the surface magnets (6) on the outer sheet metal packets (4)

Inserting the rotor (1) with the rotor shaft (2), the inner sheet metal packets (3), the buried magnet (5), the outer sheet metal packets (4), and the surface magnets (6) into the cylinder (19')

Radially inwardly adjusting the punches (21)

Overmolding the rotor (1) with plastic and thereby filling the plastic into interstices (9) between the inner sheet metal packets (3), the buried magnets (5), the outer sheet metal packets (4), and the surface magnets (6)

Adjusting the punches (21) radially outwardly, and removing the rotor (1) from the cylinder (19')

FIG. 11

METHOD FOR MANUFACTURING A ROTOR OF AN ELECTRIC MOTOR USING A TOOL

CROSS-REFERENCE TO RELATED APPLICATION

This application claims priority on German Patent Application No 10 2022 110 023.5 filed Apr. 26, 2022, the entire disclosure of which is incorporated herein by reference.

BACKGROUND

Field of the Invention. The invention relates to a method for manufacturing a rotor of an electric motor and to a rotor manufactured by the method.

Related Art DE 10 2016 221 291 A1 discloses an apparatus for inductively heating permanent magnets to achieve a fixed fit of the permanent magnets in magnetic pockets of a rotor by activating a coating and/or glue in these magnetic pockets.

DE 10 2019 212 205 A1 discloses a rotor of an electric machine, comprising a sheet metal packet extending about a motor axis. An outer tolerance compensation layer is applied to a radially outer peripheral surface of the sheet metal packet. A cylindricality tolerance of the outer surface of the outer tolerance compensation layer is less than the cylindricality tolerance of the radially outer peripheral surface of the sheet metal packet.

An automated tool for assembling a rotor on a rotor shaft is known from CN 204089522 U.

Further devices for assembling a rotor of an electric motor are known from JP 2006081360 A and JP 2006180679 A.

The increasing electrification of motor vehicles also means the increasing use of electric motors to drive them. Such electric motors often are configured as PSM motors, wherein sheet metal packets typically are joined on a rotor shaft of a rotor for such an electric motor. If the sheet metal packets are parceled, i.e. divided, a particularly high manufacturing cost is required for the assembly of such a rotor.

The present invention therefore addresses the problem of providing a method for manufacturing a rotor of an electric motor by means of which motors having multi-part sheet metal packets can be manufactured extremely exactly.

SUMMARY

The invention relates to a method for manufacturing a rotor with multi-part sheet metal packets, in which rectangularity and coaxiality of the sheet metal packets on a rotor shaft and a total run-out of the rotor can be set. The method includes manufacturing a rotor of an electric motor. The rotor includes a rotor shaft, inner sheet metal packets, for example star-shaped inner sheet metal packets, outer sheet metal packets, buried magnets arranged in an assembled state between the inner and outer sheet metal packets, and surface magnets arranged in the assembled state on the outside of the outer sheet metal packets. The inner sheet metal packets are first pushed and/or pressed onto the rotor shaft and aligned with respect to rectangularity and coaxiality. In this context, rectangularity refers to a state where a disk plane of the inner sheet metal packet is orthogonal to an axis of the rotor shaft. The rotor then is constructed by placing the buried magnets and the outer sheet metal packets on the inner sheet metal packets and placing the surface magnets on the outer sheet metal packets. A total run-out, or generally a run-out, of the rotor then is set to be within acceptable predetermined limits, thereby achieving a predetermined desired and acceptable concentricity. Thus, both rectangularity and coaxiality of the inner sheet metal packets with respect to the rotor shaft initially are adjusted, as well as a total rotor run-out. Accordingly, tolerances of individual components, such as the outer sheet metal packets, the inner sheet metal packets, the buried magnets, or the surface magnets, can be compensated better. The method achieves a significantly improved reproducible high production quality. All component tolerances of the method are on-tool, i.e. with respect to the entire rotor after filling with a plastic. On-tool in this context means, for example, that an outer housing made of plastic is bounded by the inner surface of the tool. Thus, the outer housing receives exactly the tolerances that a tool surface has. If the tool surface is polished, for example, the surface roughness of the plastic housing is also very low.

In some embodiments of the method the rotor shaft that is equipped with the inner sheet metal packets is pushed or stuck into a first part of a two-part tool. This first part comprises a first receptacle for the rotor shaft and a second receptacle for at least a part of the inner sheet metal packets. The first receptacle and the second receptacle may be configured so that the rotor shaft and the inner sheet metal packets are aligned rectangularly to the rotor axis and, at the same time, coaxially thereto. For this purpose, the rotor shaft can be clamped in a tool, for example vertically, and the inner sheet metal packets can first be pressed onto the rotor shaft. The inner sheet metal packets that are aligned to the rotor shaft sit rectangularly on the rotor shaft. The rotor shaft that is equipped with the inner sheet metal packets is inserted into the first part of the two-part tool, namely with the rotor shaft in the first receptacle and with the inner sheet metal packets in the second receptacle.

The two-part tool has a second part with a third receptacle for the other end of the rotor shaft, and a fourth receptacle for a remaining part of the inner sheet metal packets (i. e. those that are not in the second receptacle). The third and fourth receptacles are pushed onto the rotor shaft and the inner sheet metal packets in such a way that the remaining inner sheet metal packets also are aligned rectangularly and coaxially to the rotor shaft. The fourth receptacle of the second part of the second tool first is pushed over the remaining sheet metal packets, and then the rotor shaft engages with the third receptacle with increasing overriding.

The first and second parts of the two-part tool may be connected to one another via a positive-locking connection that is located between the first and second parts. The positive-locking connection achieves an extremely exact alignment of the first and second parts of the two-part tool to one another and a highly exact coaxiality and rectangularity of all of the sheet metal packets on the rotor shaft. The positive-locking connection forces a coaxial alignment and rectangularity of the inner sheet metal packets relative to the rotor shaft when the first and second parts are connected to one another and a rotor shaft is arranged therein with inner sheet packages pushed thereon. The rectangular alignment and the coaxiality also reduce interstices between adjacent sheet metal packets.

In a further aspect of the invention, the positive-locking connection may be achieved by dowel pins that engage in associated openings. For example, dowel pins can be arranged on a front edge of the first part of the two-part tool and in positions facing the second part of the two-part tool. The associated openings are provided on a front edge of the second part of the two-part tool and in positions facing the first part. The dowel pins are configured to engage in the openings in a play-free manner when the tool is closed, thereby forcing an extremely exact coaxial connection of the two parts of the two-part tool. Groove and spring contours can be used instead of dowel pins. For example, ring grooves and/or ring springs, can be provided at positions to lead the two parts of the two-part tool into exact coaxial alignment with one another when the tool is closed.

The hollow-cylindrical second and fourth receptacles that receive the inner sheet metal packets when the tool is closed can force the rectangularity of these packets relative to the rotor shaft.

All cavities can also be cast with a plastic. Thus, the rotor assembly cannot move within itself during a subsequent deformation, and tolerances are retained.

In a further aspect of the method, a specified or desired overall concentricity (a total run-out that is no greater than a specified maximum permissible total run-out) is created by first heating a cylinder, and then inserting the rotor into this cylinder with the rotor shaft, the inner sheet metal packets, the buried magnet, the outer sheet metal packets, and the surface magnets. A temperature balance then is awaited, at which point the cylinder shrinks onto the rotor and thus creates or forces the predetermined specified or desired overall concentricity (a total run-out that is less than the predetermined maximum permissible total run-out). Then, all cavities are cast with a plastic. Thus, the rotor assembly can no longer be moved within itself during a subsequent deformation and tolerances are retained. Once the specified or desired overall concentricity (specified maximum permissible total run-out) is created, the cylinder is heated and removed from the rotor. Purely theoretically, a corresponding cooling of the rotor with insertion into the optionally heated cylinder and waiting for a temperature balance is also conceivable. Only the cylinder or the rotor can be temperature-controlled, or both components are cooled in a different direction, i.e. the rotor along with the rotor shaft, inner sheet metal packets, outer sheet metal packets, buried magnets and surface magnets, and the cylinder is heated, in each case before the insertion of one into another. The inner contour of the tool, i.e. an inner housing surface of the cylinder, thereby is forced onto the rotor by the temperature balance. This provides a possibility for manufacturing within the predetermined specified or desired overall concentricity (specified maximum permissible total run-out) that is technically simple from a production viewpoint and at the same time highly precise.

In an alternative embodiment of the method, a cuff tool is placed around the rotor with the rotor shaft, inner sheet metal packets, buried magnets, outer sheet metal packets, and surface magnets. An inner diameter of the cuff tool then is reduced until a total run-out of the rotor is less than or equal to a maximum acceptable total runout, thereby achieving an acceptable overall concentricity. All cavities then are cast with a plastic. Thus, the rotor assembly can no longer be moved within itself during a subsequent deformation so that the tolerances are retained. The inner diameter of the cuff tool then is enlarged, and the cuff tool is removed from the rotor. The cuff tool can generally function as a hose clip and can reduce the inner diameter by contracting to force the roundness of the cuff tool or the clamping tool onto the rotor. The cuff tool or the cuff of the cuff tool can be closed, for example, analogously to hose clamps, by means of screws. Hydraulic or pneumatic cylinders also can be used.

In a further alternative embodiment of the method, a cylinder is provided with radially inwardly adjustable punches. The rotor is pushed into the cylinder along with the rotor shaft, the inner sheet metal packets, the buried magnet, the outer sheet metal packets, and the surface magnets. Subsequently, the punches are adjusted radially inward, for example by corresponding hydraulics or pneumatics, thereby forcing the specified or desired overall concentricity (specified maximum permissible total run-out). Stamps can be designed specially to ensure that they always arrive at the same distance. Then, all cavities are cast with a plastic. Thus, the rotor assembly can no longer be moved within itself during a subsequent deformation, and the tolerances are retained. The punches then are adjusted radially outwardly, and the rotor can be removed from the cylinder or tool. This aspect ensures a comparatively simple adjustment of a predetermined specified overall concentricity (specified maximum permissible total run-out), achieves a smooth functioning and provides a consistent clearance to a stator of the electric motor.

To prevent an undesired displacement of the individual parts, the rotor is overmolded with plastic prior to deforming, or plastic is injected into the rotor. Thus, interstices between the inner sheet metal packets, the buried magnets, the outer sheet metal packets and the surface magnets are filled at least partially by a continuous unitary matrix of plastic that retains the specified overall concentricity and a run-out that is within predetermined acceptable amounts. All cavities can be filled by a transfer molding or vacuum casting as an alternative to the injection molding process. Casting with plastic or adhesive also fixes the individual rotor parts, i.e. for example the buried magnets, the surface magnets, and the outer sheet metal packets together. After removal from the tool or from an injection molding tool, the predetermined specified or desired overall concentricity (specified maximum permissible total run-out) of the rotor is on-tool and thus process-safe. The tool completes the cavities outwardly. The plastic thus flows up to the tool and now assumes the surface structure, roundness, etc. of the tool or the surfaces there. Thus, precise fabrications of the tool can achieve highly accurate surfaces and roundness of the plastic.

The invention further relates to a rotor by means of the disclosed method, thereby manufacturing an extremely high-quality rotor itself with multi-part sheet metal packets.

Further important features and advantages of the invention arise from the drawings, and from the accompanying description with reference to the drawings.

It goes without saying that the features mentioned above and those yet to be discussed below can be used not only in the respectively specified combination, but also in other combinations or on their own, without leaving the scope of the invention. The components described above and referred to below of a higher-level unit, e.g. a device, an apparatus, or an assembly, which are designated separately, can constitute separate components of this unit, or integral regions or sections of this unit, even if shown differently in the drawings.

Exemplary embodiments of the invention are set forth in the drawings and will be explained in further detail in the description below, wherein identical reference numbers refer to identical, similar, or functionally identical components.

BRIEF DESCRIPTION OF THE DRAWINGS

FIG. 9 depicts a method for manufacturing a rotor of an electric motor using a two-part tool.

FIG. 10 depicts a method for manufacturing a rotor of an electric motor using a cuff tool.

FIG. 11 depicts a method for manufacturing a rotor of an electric motor using a cylinder with radially inwardly adjustable punches.

DETAILED DESCRIPTION

Figure 1:
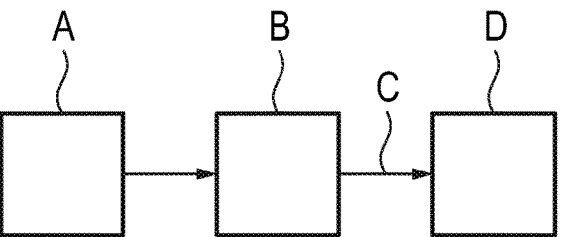
FIG. 1 schematically illustrates steps for manufacturing a rotor of an electric motor in accordance with an embodiment of the invention.
Figure 2:
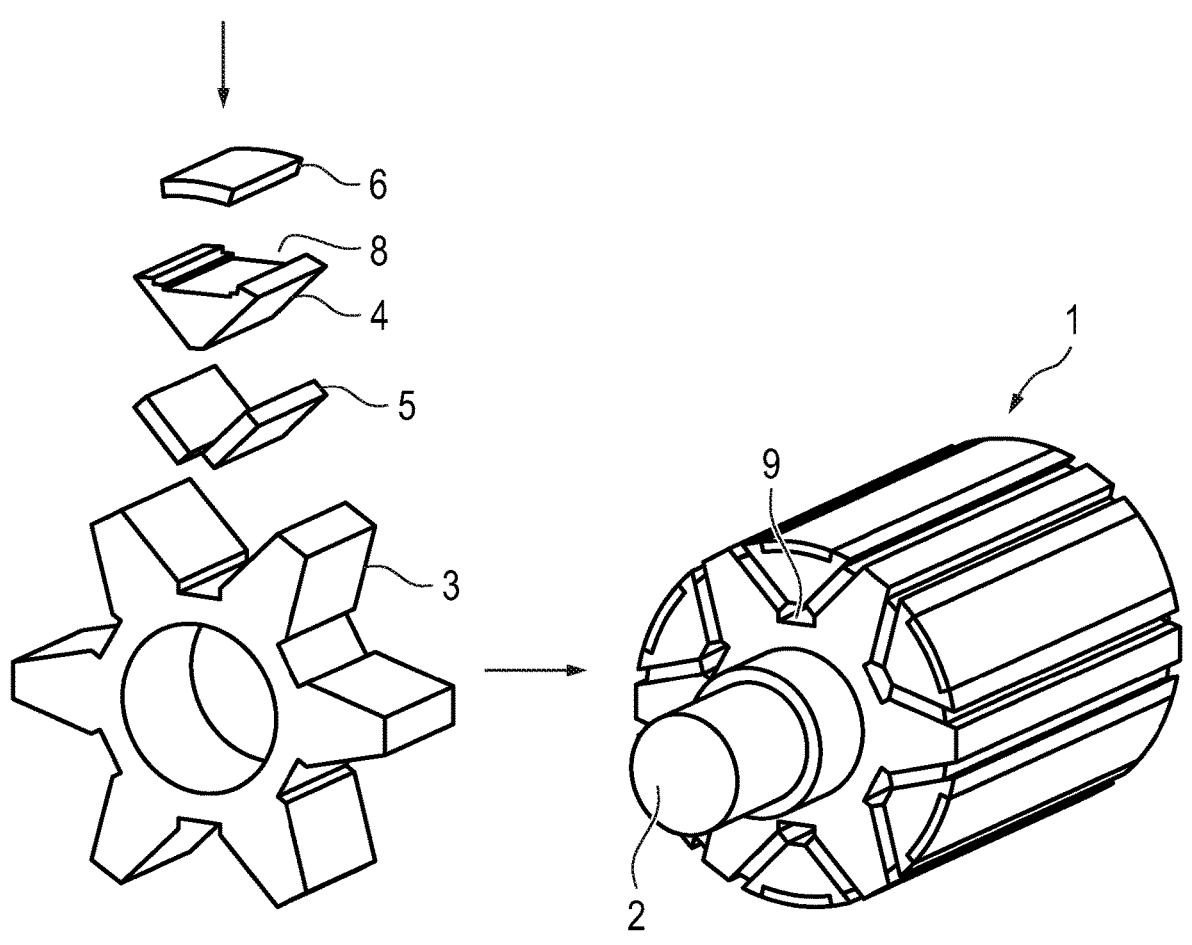
FIG. 2 is an exploded perspective view of a rotor of an electric motor manufactured according to the method of the invention.
Figure 3:
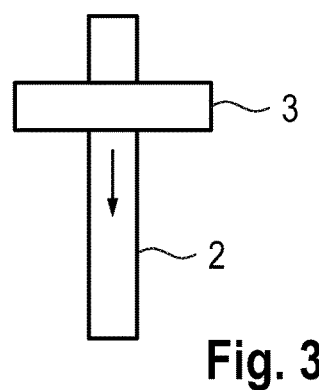
FIG. 3 illustrates a step of a method according to the invention with inner sheet metal packets being pushed onto the rotor shaft.
Figure 4:
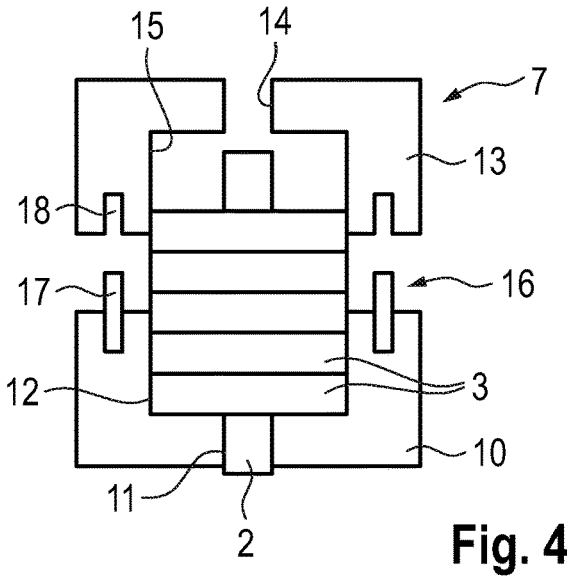
FIG. 4 schematically illustrates a step of a method for achieving rectangular and coaxial alignment of the inner sheet metal packets and the rotor shaft when the two-part tool is still open.
Figure 5:
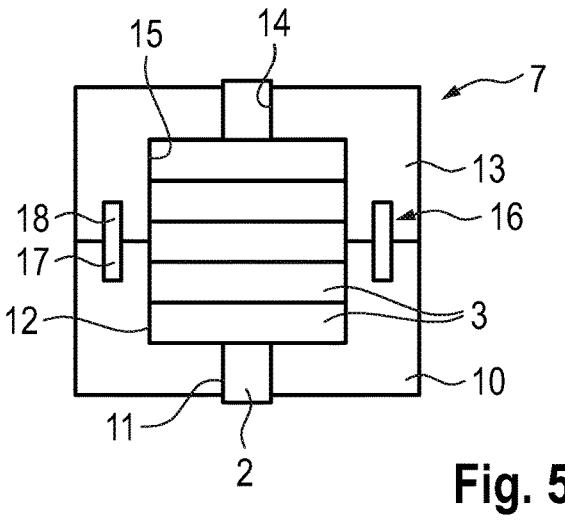
FIG. 5 illustrates the two-part tool of FIG. 4 in a closed condition.

FIG. 1, illustrates a method according to the invention for manufacturing a rotor 1, as shown in FIG. 2. The rotor 1 comprises a rotor shaft 2, inner sheet metal packets 3, outer sheet metal packets 4, buried magnets 5 and surface magnets 6. The method is carried out to set both rectangularity and coaxiality of the inner sheet metal packets 3 relative to the rotor shaft 2 and also to set a maximum acceptable total run-out or overall concentricity of the rotor 1. The inner sheet metal packets 3 can consist of individual rotor sheets and are pushed onto the rotor shaft 2, as shown in FIG. 3. This is done in method step A of FIG. 1. Rectangular and coaxial alignment of the sheet metal packets 3 on the rotor shaft 2 can occur, for example, by means of a two-part tool 7, as shown in FIGS. 4 and 5, and as discussed below.

The rotor 1 is constructed by placing the buried magnets 5 and the outer sheet metal packets 4 on the inner sheet metal packets 3 and placing the surface magnets 6 on a respectively associated outer sheet metal packet 4.

The inner sheet metal packets 3 of FIGS. 2, 6 to 8 have a star-shaped cross-section, while the outer sheet metal packets 4 have a substantially triangular cross-section. FIG. 2 shows that a recess 8 is arranged on an outer surface of the outer sheet metal packets 4 and is configured to be complementary to a shape of the surface magnets 6. Thus, a surface magnet 6 can be received in a positive-locking manner in a respectively associated recess 8 on the outer sheet metal packet 4. The assembly of the rotor 1 shown in FIG. 2 proceeds with method step B of FIG. 1. More particularly, the inner sheet metal packet 3 first typically is pushed onto the rotor shaft 2 and only then the attachment of the buried magnets 5, the outer sheet metal packets 4, and the surface magnets 6 is done. In this case, "buried" means that the buried magnets 5 are arranged to be hidden between the inner sheet metal packets 3 and the outer sheet metal packets 4. In a further subsequent method step C, the run-out of the rotor is forced to an amount that is less than or equal to a specified or predetermined maximum permissible total runout (i.e. to achieve a specified or desired overall concentricity) of the rotor 1, for example by the tools shown in FIGS. 6 to 8.

After creating the total run-out, the rotor 1 is overmolded with plastic or adhesive so that interstices 9 of FIG. 2 are filled with plastic or adhesive. This also serves to fix the buried magnets 5, the outer sheet metal packets 4, and the surface magnets 6. A complete sheathing of the rotor 1 with plastic and thus the coating with a protective layer also can be carried out, for example, in method step D.

According to FIG. 1, merely by way of example, a total of four method steps A to D are shown. However, intermediate steps that serve to refine the method of the invention also can be provided in a very understandable manner.

In a further development, the rotor shaft 2 equipped with the inner sheet metal packets 3 is introduced into a first part 10 of the two-part tool 7, as shown in FIG. 4. The first part 10 has a first receptacle 11 for the rotor shaft 2 and a second receptacle 12 for at least a part of the inner sheet metal packets 3. The first receptacle 11 and the second receptacle 12 are configured to align the rotor shaft 2 and the inner sheet metal packets 3 rectangularly and coaxially.

The two-part tool 7 also has a second part 13 with a third receptacle 14 for the rotor shaft 2 and a fourth receptacle 15 for the sheet metal packets 3 that cannot be received in the second receptacle 12.

In a subsequent method step, the second part 13 of the two-part tool 7 is pushed onto the rotor shaft 2 and the remaining inner sheet metal packets 3, as shown in FIG. 5 so that the rotor shaft 2 and all of the inner sheet metal packets 3 are aligned rectangularly and coaxially. In this case, "rectangular" merely means that a disk plane of the inner sheet metal packet 3 is orthogonal to an axis of the rotor shaft 2.

A predefined connection between the two parts 10 and 13 of the two-part tool 7 is achieved by a positive-locking connection 16 between the first part 10 and the second part 13. When the first part 10 and the second part 13 are connected to one another and a rotor shaft 2 is arranged therein with inner sheet packages 3 pushed thereon, the positive-locking connection 16 forces a coaxial alignment and rectangularity of the inner sheet packets 3. The positive-locking connection 16, for example, can comprise dowel pins 17 as well as associated openings 18. The dowel pins 17 engage with the openings 18 when the positive-locking connection 16 is closed. Of course, other positive-locking connections, such as outer ring grooves or ring springs, are also possible.

The tools shown in FIGS. 6 to 8 can alternatively be used to ensure a total run-out of the rotor 1 with the highest quality and accuracy.

Figure 6A:
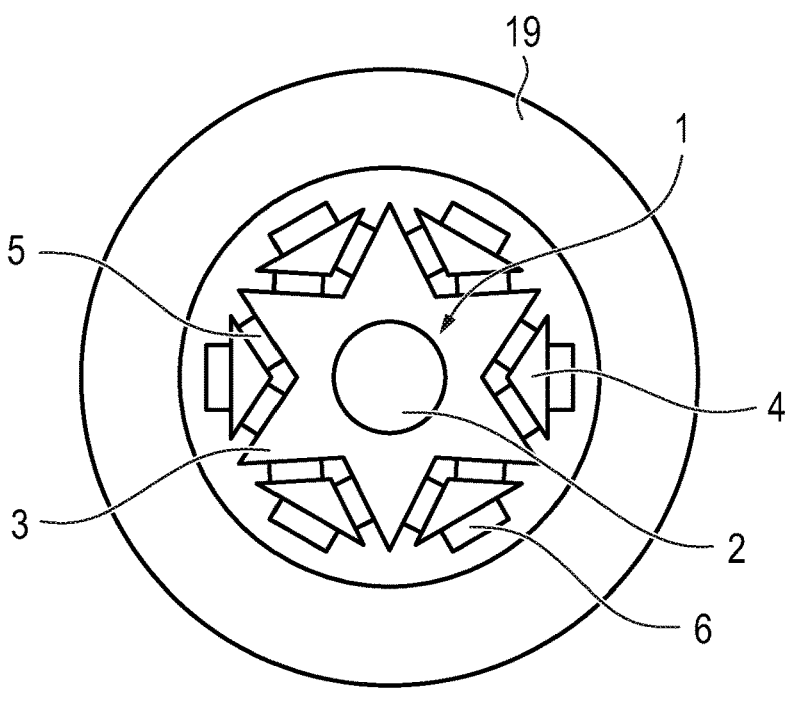
FIG. 6*a* illustrates a method step for creating a total run-out with a heated cylinder.
Figure 6B:
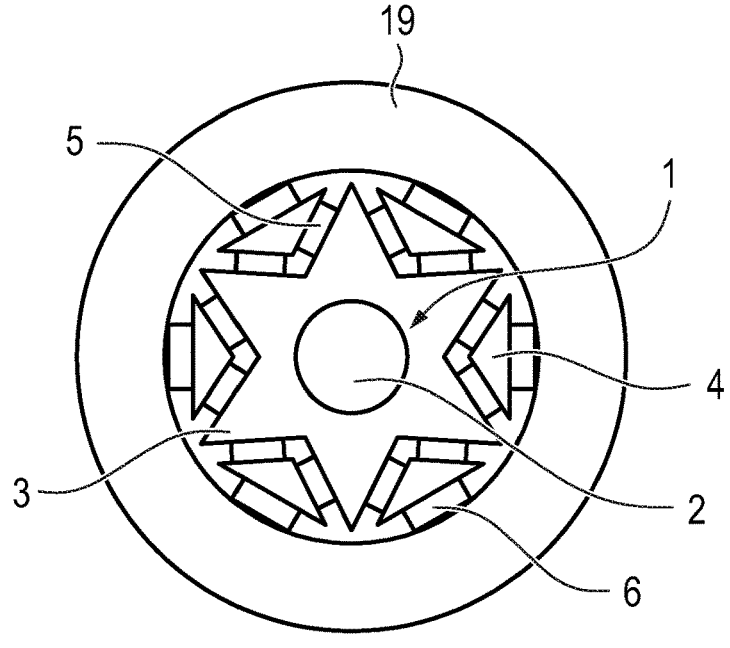
FIG. 6*b* illustrates the cylinder of FIG. 6*a*, but with the cylinder cooled and shrunk onto the rotor.

According to FIG. 6*a*, for example, a cylinder 19 is heated, thereby extending the cylinder 19 in a temperature-based manner. The rotor 1 then is inserted with the rotor shaft 2, the inner sheet metal packets 3, the buried magnet 5, the outer sheet metal packets 4, and the surface magnet 6 into the cylinder 19, and a temperature balance is awaited, at which point the cylinder 19 shrinks onto the rotor 1, as shown in FIG. 6*b*. The cylinder 19 then is heated again, and the rotor 1 can be removed.

Purely theoretically, a pressing out of the rotor 1 from the still warm cylinder 19 also is conceivable, provided no damage occurs. The rotor 1 can be cooled in addition to or as an alternative to heating the cylinder 19.

Figure 7A:
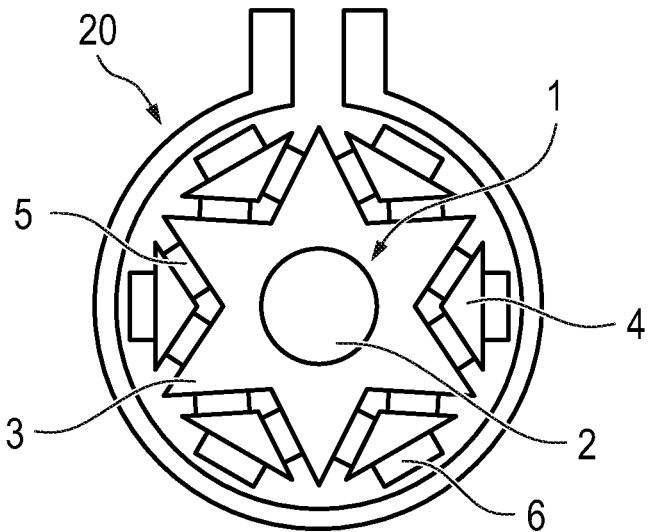
FIG. 7*a* illustrates a method step for creating the total run-out of the rotor when a cuff tool is still open.
Figure 7B:
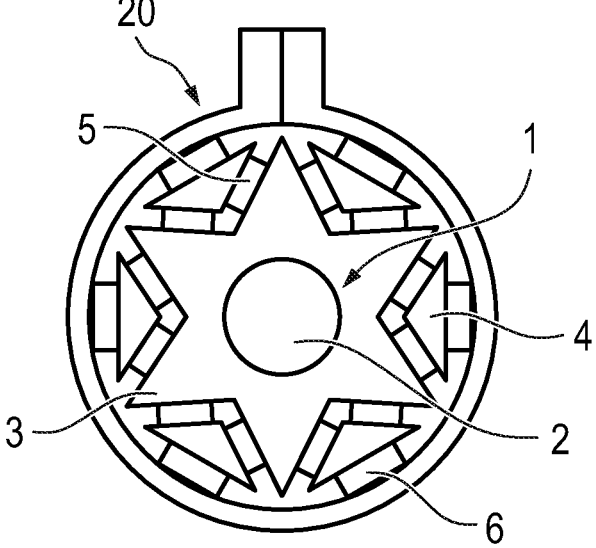
FIG. 7*b* is a view similar to FIG. 7*a*, but when the cuff tool is closed.

FIGS. 7*a* and 7*b* show an embodiment where a cuff tool 20 is placed around the rotor 1 that includes the rotor shaft 2, inner sheet metal packets 3, buried magnets 5, outer sheet metal packets 4, and surface magnets 6. As shown in FIG. 7a, an inner diameter of the cuff tool 20 is reduced to achieve a total run-out of the rotor 1. The inner diameter can be reduced, for example, by bolts similar to a hose clip or a hydraulic adjustment. The inner diameter of the cuff tool 20 then is extended to remove the rotor 1.

Figure 8A:
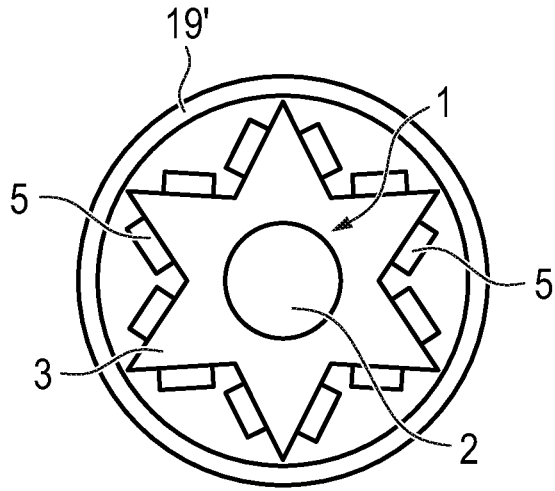
FIG. 8*a* illustrates a rotor inserted into a cylinder.
Figure 8B:
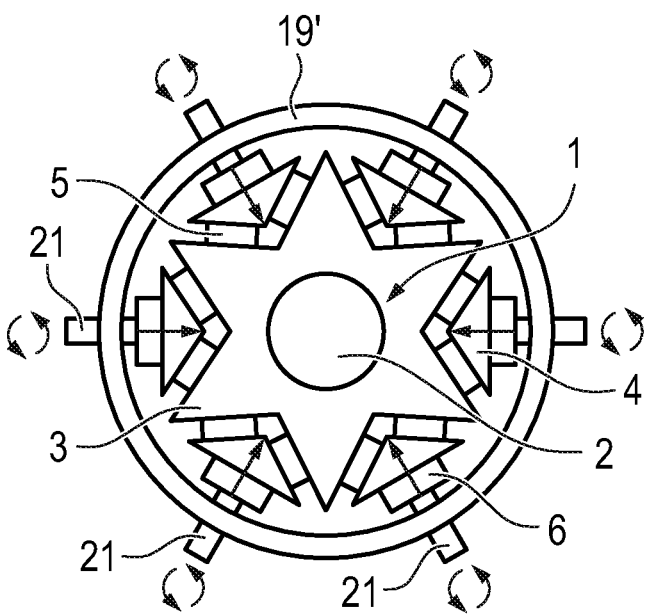
FIG. 8*b* illustrates an exposure of the rotor by radially inwardly adjustable punches.

The tool shown of FIGS. 8a and 8b, in particular with regard to FIG. 8b, is a cylinder 19' with radially-inwardly adjustable punches 21. The rotor 1 with the rotor shaft 2, inner sheet metal packets 3, and at least the buried magnet 5 is inserted into the cylinder 19'. The rotor 1 can be constructed already and consequently can have the outer sheet metal packets 4 as well as the surface magnets 6. The punches 21 are adjusted radially inwardly to force the total run-out of the rotor 1. Thus, the rotor 1 is compressed uniformly radially inward. Once the total run-out of the rotor 1 is set to an amount that is less than or equal to a predetermined specified maximum run-out (to an overall concentricity that is acceptable), the punches 21 are adjusted radially outwardly, and the rotor 1 can be removed from the cylinder 19'.

The method of the invention enables a rotor 1 to be manufactured comparatively simply, in an automated fashion, and quickly, and moreover with improved total run-out, rectangularity and coaxiality.

FIG. 9 depicts a method for manufacturing a rotor of an electric motor using a two-part tool. FIG. 10 depicts a method for manufacturing a rotor of an electric motor using a cuff tool. FIG. 11 depicts a method for manufacturing a rotor of an electric motor using a cylinder with radially inwardly adjustable punches.

The invention claimed is:

1. A method for manufacturing a rotor (1) of an electric motor using a two-part tool (7) having a first part (10) and a second part (13), the method comprising:
providing a rotor shaft (2), inner sheet metal packets (3), outer sheet metal packets (4), buried magnets (5), and surface magnets (6);
pushing the inner sheet metal packets (3) onto the rotor shaft (2);
placing the buried magnets (5) and the outer sheet metal packets (4) on the inner sheet metal packets (3) and placing the surface magnets (6) on the outer sheet metal packets (4);
inserting a first end of the rotor shaft (2) having at least one of the inner sheet metal packets (3) into the first part (10) of the two-part tool (7) by positioning the first end of the rotor shaft (2) within a first receptacle (11) of the first part (10) and positioning the at least one of the inner sheet metal packets (3) within a second receptacle (12) of the first part (10);
inserting the second part (13) of the two-part tool (7) onto a second end of the rotor shaft (2) having the inner sheet metal packets (3) by positioning the second end of the rotor shaft (2) within a third receptacle (14) of the second part (13) and positioning at least a second one of the inner sheet metal packets (3) that is not inserted into the second receptacle (12) within a fourth receptacle (15) of the second part (13);
connecting the first part (10) and the second part (13) of the two-part tool (7) by inserting pins (17) of one of the first part (10) and the second part (13) into openings (18) of the other of the first part (10) and the second part (13).

2. The method of claim 1, connecting the first part (10) and the second part (13) of the two-part tool (7) forces a coaxial alignment between the inner sheet metal packets (3).

3. A method for manufacturing a rotor (1) of an electric motor using a cuff tool (20), the method comprising:
providing a rotor shaft (2), inner sheet metal packets (3), outer sheet metal packets (4), buried magnets (5), and surface magnets (6);
pushing the inner sheet metal packets (3) onto the rotor shaft (2);
placing the buried magnets (5) and the outer sheet metal packets (4) on the inner sheet metal packets (3) and placing the surface magnets (6) on the outer sheet metal packets (4);
placing the cuff tool (20) around the rotor (1), the rotor shaft (2), the inner sheet metal packets (3), the buried magnets (5), the outer sheet metal packets (4), and the surface magnets (6);
reducing an inner diameter of the cuff tool (20);
overmolding the rotor (1) with plastic and thereby filling interstices (9) between the inner sheet metal packets (3), the buried magnets (5), the outer sheet metal packets (4), and the surface magnets (6) with the plastic; and
increasing an inner diameter of the cuff tool (20) and then removing the cuff tool (20) from the rotor (1).

4. A method for manufacturing a rotor (1) of an electric motor using a cylinder (19') with radially inwardly adjustable punches (21), the method comprising:
providing a rotor shaft (2), inner sheet metal packets (3), outer sheet metal packets (4), buried magnets (5), and surface magnets (6),
pushing the inner sheet metal packets (3) onto the rotor shaft (2),
placing the buried magnets (5) and the outer sheet metal packets (4) on the inner sheet metal packets (3) and placing the surface magnets (6) on the outer sheet metal packets (4),
inserting the rotor (1) with the rotor shaft (2), the inner sheet metal packets (3), the buried magnet (5), the outer sheet metal packets (4), and the surface magnets (6) into the cylinder (19'),
radially inwardly adjusting the punches (21),
overmolding the rotor (1) with plastic and thereby filling the plastic into interstices (9) between the inner sheet metal packets (3), the buried magnets (5), the outer sheet metal packets (4), and the surface magnets (6), and
adjusting the punches (21) radially outwardly, and removing the rotor (1) from the cylinder (19').

* * * * *